UNITED STATES PATENT OFFICE.

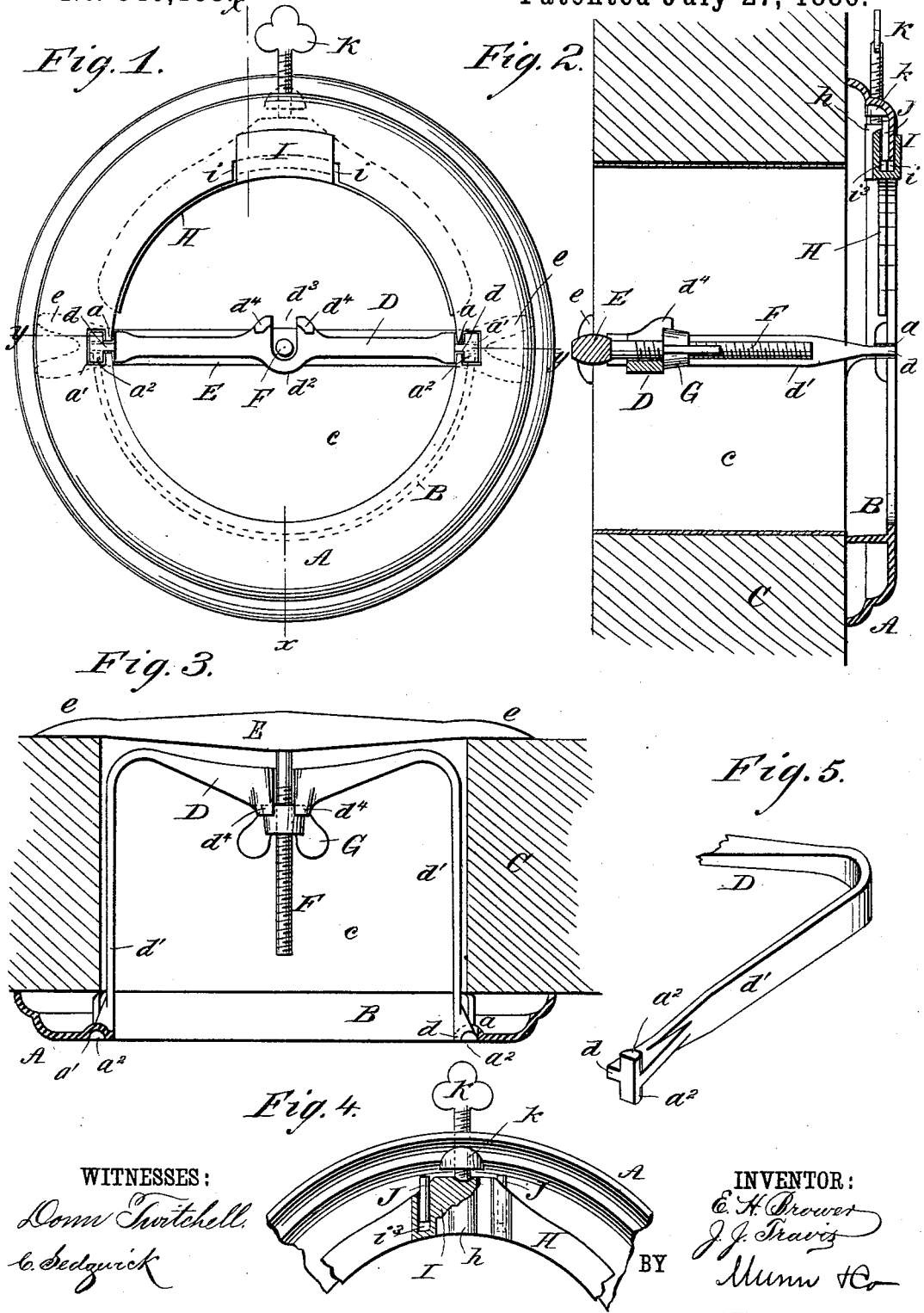

EMMETT H. BROWER AND JOHN J. TRAVIS, OF CARSON CITY, MICHIGAN.

STOVE-PIPE COLLAR AND CLAMP.

SPECIFICATION forming part of Letters Patent No. 346,188, dated July 27, 1886.

Application filed September 1, 1885. Serial No. 175,920. (No model.)

*To all whom it may concern:*

Be it known that we, EMMETT H. BROWER and JOHN J. TRAVIS, both of Carson City, in the county of Montcalm and State of Michigan, have invented a new and Improved Stove-Pipe Collar and Clamp, of which the following is a full, clear, and exact description.

Our invention relates to collars and clamps for holding stove-pipes in the holes of chimney-flues, and has for its objects to hold the pipe securely in the collar, and so as to prevent forcing the pipe back too far into the flue, and also to prevent the pipe from slipping forward out of the collar, and to hold the collar securely to the chimney-wall, and also to prevent soiling of the wall-finish by soot or dust when the pipe is removed from the flue for any purpose.

The invention consists in certain novel features of construction and combinations of parts of the stove-pipe collar and clamps, all as hereinafter fully described and claimed.

Reference is to be had to the accompanying drawings, forming part of this specification, in which similar letters of reference indicate corresponding parts in all the figures.

Figure 1 is an outside face view of our improved stove-pipe collar and clamp, with the nut of the collar-clamp removed. Fig. 2 is a sectional view of the collar and clamp on the line $x\ x$, Fig. 1, and as attached to the front wall of a chimney or fire-place. Fig. 3 is a sectional view of the same on the line $y\ y$, Fig. 1. Fig. 4 is a detail inner face view of the upper part of the collar, parts being broken away and shown in section; and Fig. 5 is a detail perspective view of one arm of the clamp-bar.

The letter A indicates the stove-pipe collar, which is round in general form, and has annular stiffening-corrugations. At its lower part, and for about one-half way around, at a short distance back from its central opening, the collar is formed with an inwardly-projecting flange, B, the inner edge of which, together with the outer edge of the collar, rests against the face of the chimney-wall C, as in Fig. 2.

In the face of the collar A, at diametrically-opposite points, are formed the notches $a\ a$, at the base of which notches in the face of the collar are formed the recesses $a'\ a'$, into which notches the ends $d\ d$ of the opposite side parts, $d'\ d'$, of the bowed clamp-bar D are adapted to enter. The clamp-bar D is made in U form, its cross-bar is widened toward the center, and at its center, on one side, is formed the swell $d^2$, and in the opposite side is formed the recess $d^3$, at the sides of which recess are formed the outwardly and upwardly projecting lugs $d^4$. The ends of the arms $d'$ are flattened to enter the notches $a$ of the collar, and are provided with the side lugs, $a^2$, which fit in the recesses $a'$ in the face of the collar, whereby the ends of the arms $d'$ are flush with the said face.

Across the stove-pipe hole $c$ in the wall C is placed, by its ends $e\ e$ resting against the back of said wall, the bar E, which has fixed to it the bolt end F, which passes through the recess $d^3$ of the cross-piece of the bar D, and receives a nut, G, which, when screwed tightly to the cross-piece, will hold the bar E to the back of the wall C, and will draw the lugs $a^2\ a^2$ on the ends $d\ d$ of the bar D hard into the recesses $a'\ a'$ of the collar A, and thereby bind said collar firmly to the outer face of the wall, as in Fig. 2, and centrally around the stove-pipe hole $c$. The bolt F is held in the recess $d^3$ by the back of the said recess, and by the nut G, resting against the lugs $d^4$, and keeps the collar-clamp bars D E in proper relative positions. The nut G is removed from bolt F in Fig. 1, to show the bolt-recess and lugs to better advantage.

Directly opposite the semicircular or inturned flange B of the collar is placed the curved stove-pipe-clamp plate H, which extends about half-way around the inner margin of the opening of the collar A, and at the inner face of said collar, and at its central part, it is provided with a flange, I, which projects beneath the inner edge of the collar A, and preferably through a notch, $i$, formed in the collar, and thence upward at the outer face of the collar. On the inner face of the collar A are formed the long lugs J, corresponding with recesses $i^3$, formed in the inner face of the flange I, said lugs J and recesses $i^3$ serving to steady and guide the clamp-plate H, so that said plate will be forced down fairly on the top of a stove-pipe placed within the collar A by a screw, K, passing through the collar A. Another object of the flange I, lugs J, and recesses $i^3$ is to prevent detachment of the clamp-plate H from the collar A when the stove-pipe is removed from beneath the clamp-plate, as these parts are intended to fit snugly together. The screw K is threaded through the collar A, or a lug, $k$, thereon, and is turned down onto the top of the clamp-plate H, or onto a lug, $h$, fixed thereto, said lug $h$ preferably having a recess to receive the end of the screw, as best seen in Fig. 4. The screw K may be a thumb-screw, to be turned by the fingers, or may have a nicked upper end or head, so as to be turned by a screw-driver.

It is evident that the cross-piece of the clamp-bar D will prevent the stove-pipe being pushed in against the back wall of the flue; hence the draft cannot be obstructed from this cause, and when the stove-pipe is clamped between the plate H and the lower part of the collar A the pipe cannot slip forward out of the hole $c$ in the wall, and stay-wires for securing the pipe in place are unnecessary.

Another advantage of our device is, that there is nothing at the back of the wall C which can interfere with the cleaning of the chimney-flue, as the clamp-bar E offers little or no obstruction to the passage of the brush, and the stove-pipe and its collar and clamp need not then be removed.

A further advantage of our collar is, that the flange B at its lower part prevents the escape of soot or dust onto the outer face of the chimney-wall C when the stove-pipe is withdrawn from the hole $c$ in the wall for cleaning or readjusting the pipe.

We propose to make the collar and clamp of malleable iron, so that they will be cheap and durable, and the collar may be ornamented in various ways to present a neat and pleasing finish.

Having thus described our invention, we claim as new and desire to secure by Letters Patent—

1. A stove-pipe collar and clamp comprising the collar A, provided with notches $a\, a$, a bowed clamp-bar D, having ends $d\, d$, adapted to the collar-notches $a\, a$, a clamp-bar, E, provided with a bolt end, F, a nut, G, on bolt F, a clamp-plate, H, supported at its center at the top of the collar, and a clamp-screw threaded into the collar and adapted to clamp the plate H to the pipe, substantially as herein set forth.

2. The U-shaped clamp-bar D, having a recess, $d^3$, in the center of its cross-bar, and provided with lugs $d^4$, in combination with the collar A, the bar E, provided with the screw-rod F, and the thumb-screw G, substantially as herein shown and described.

3. A stove-pipe collar and its clamp comprising a collar, A, provided with opposite notches and recesses, $a\, a'$, a bowed clamp-bar, D, having ends $d\, a^2$, a clamp-bar, E, provided with a bolt end, F, and a nut, G, on said bolt, substantially as herein set forth.

4. The combination, with the stove-pipe collar A, provided with the lugs J, of a clamp-plate, H, provided with a flange, I, having recess $i^3$, adapted to lugs J, and the set-screw K, substantially as herein set forth.

5. The combination, with a collar, of a U-shaped bar secured to the same, and a bar adjustably secured to the U-shaped bar, and of greater length than the distance between the arms of the said U-shaped bar, substantially as herein shown and described.

EMMETT H. BROWER.
JOHN J. TRAVIS.

Witnesses:
B. FRANK SWEET,
MILAN A. YEOMANS.